United States Patent
Bosch et al.

(10) Patent No.: US 10,792,997 B2
(45) Date of Patent: Oct. 6, 2020

(54) MOLDED FUEL TANK AND METHOD OF MANUFACTURING THE SAME

(71) Applicants: Bruce Bosch, Vancouver, WA (US); Neal Keefer, Portland, OR (US)

(72) Inventors: Bruce Bosch, Vancouver, WA (US); Neal Keefer, Portland, OR (US)

(*) Notice: Subject to any disclaimer, the term of this patent is extended or adjusted under 35 U.S.C. 154(b) by 186 days.

(21) Appl. No.: 15/485,954

(22) Filed: Apr. 12, 2017

(65) Prior Publication Data

US 2019/0184814 A1 Jun. 20, 2019

Related U.S. Application Data

(63) Continuation-in-part of application No. 13/753,518, filed on Jan. 30, 2013, now Pat. No. 10,023,322.

(60) Provisional application No. 61/632,759, filed on Jan. 30, 2012.

(51) Int. Cl.
*B60K 15/04* (2006.01)
*B60K 15/03* (2006.01)
*B60R 3/00* (2006.01)
*B62D 35/00* (2006.01)
*B60K 15/035* (2006.01)
*B60K 15/067* (2006.01)

(52) U.S. Cl.
CPC ............. *B60K 15/04* (2013.01); *B60K 15/03* (2013.01); *B60K 15/03177* (2013.01); *B60K 15/035* (2013.01); *B60K 15/0406* (2013.01); *B60K 15/067* (2013.01); *B60K 2015/03032* (2013.01); *B60K 2015/0348* (2013.01); *B60K 2015/03217* (2013.01); *B60K 2015/03427* (2013.01); *B60K 2015/03434* (2013.01); *B60K 2015/03473* (2013.01); *B60K 2015/03493* (2013.01); *B60R 3/00* (2013.01); *B60Y 2200/14* (2013.01); *B62D 35/008* (2013.01)

(58) Field of Classification Search
CPC .. B65D 39/084; B60K 15/0406; B60K 15/04; B60K 15/03177; B60K 2015/0458; B60K 2015/0496; B64D 37/14
USPC .......... 220/562–564, 567.2, 4.14, 86.2, 86.3, 220/DIG. 33, 288, 611
See application file for complete search history.

(56) References Cited

U.S. PATENT DOCUMENTS

| | | | | |
|---|---|---|---|---|
| 219,099 A | * | 9/1879 | Johnson | B65D 39/084 16/2.4 |
| 632,457 A | * | 9/1899 | Gardiner | B65D 39/084 16/2.4 |
| 735,377 A | * | 8/1903 | Hochheimer | B65D 39/084 16/2.4 |
| 944,378 A | * | 12/1909 | Pfluger | B21D 51/40 16/2.3 |
| 1,513,638 A | * | 10/1924 | Schwartz | B65D 39/084 220/288 |
| 1,554,764 A | * | 9/1925 | Schwartz | B65D 39/084 285/202 |
| 1,591,058 A | * | 7/1926 | Schwartz | B65D 39/084 285/202 |

(Continued)

*Primary Examiner* — Fenn C Mathew
*Assistant Examiner* — Jennifer Castriotta
(74) *Attorney, Agent, or Firm* — Ingrid McTaggart

(57) ABSTRACT

One embodiment of a molded fuel tank includes a fuel tank molded as one piece of rotationally molded cross-linked polyethylene material. One embodiment may include molding a fuel tank wall as a single layer of material with a metal component fastening structure positioned within the single layer fuel tank wall as it is molded.

13 Claims, 12 Drawing Sheets

SECTION B-B
SCALE 1 : 2

(56) References Cited

U.S. PATENT DOCUMENTS

| | | | | |
|---|---|---|---|---|
| 1,644,154 A | * | 10/1927 | Schriner | B65D 39/084 |
| | | | | 285/204 |
| 1,656,241 A | * | 1/1928 | Schwartz | B65D 39/084 |
| | | | | 285/202 |
| 3,946,894 A | * | 3/1976 | Simkus | B65D 39/084 |
| | | | | 220/257.1 |
| 4,137,602 A | * | 2/1979 | Klumpp, Jr. | B65D 39/04 |
| | | | | 16/2.1 |
| 4,501,374 A | * | 2/1985 | Robertson | B60K 15/04 |
| | | | | 137/513.5 |
| 4,656,689 A | * | 4/1987 | Dennis | F16L 5/027 |
| | | | | 16/2.2 |
| 4,679,698 A | * | 7/1987 | Thorn | B67D 7/344 |
| | | | | 220/86.2 |

\* cited by examiner

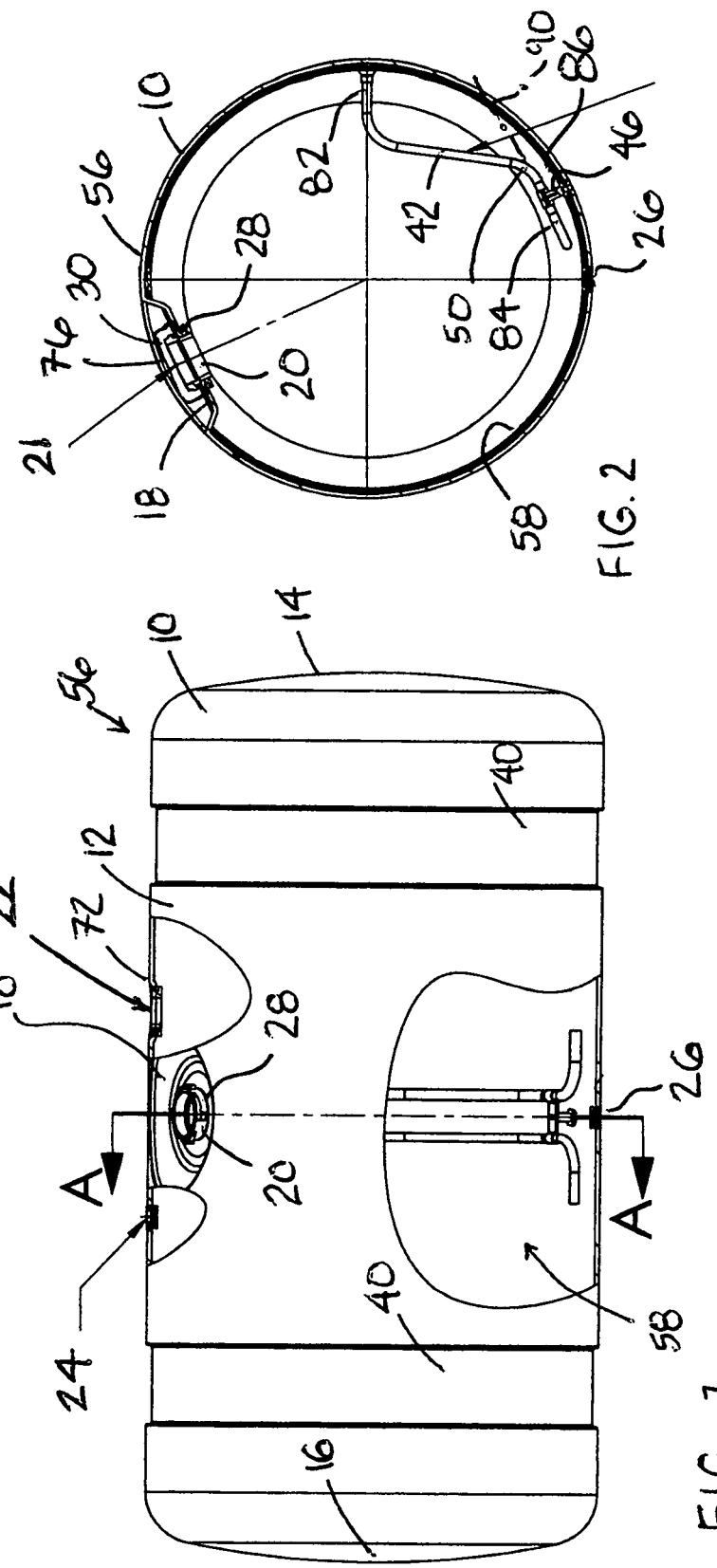

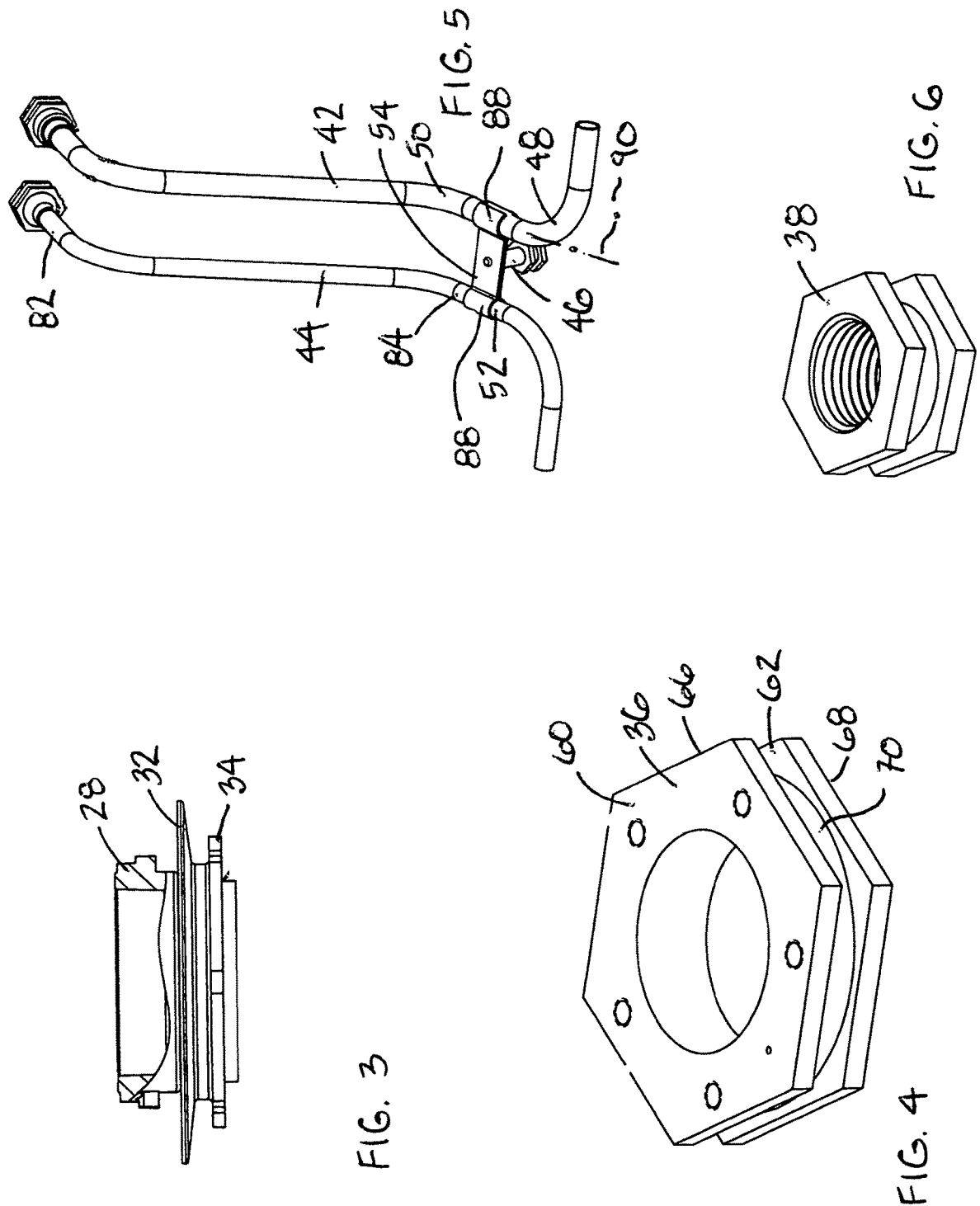

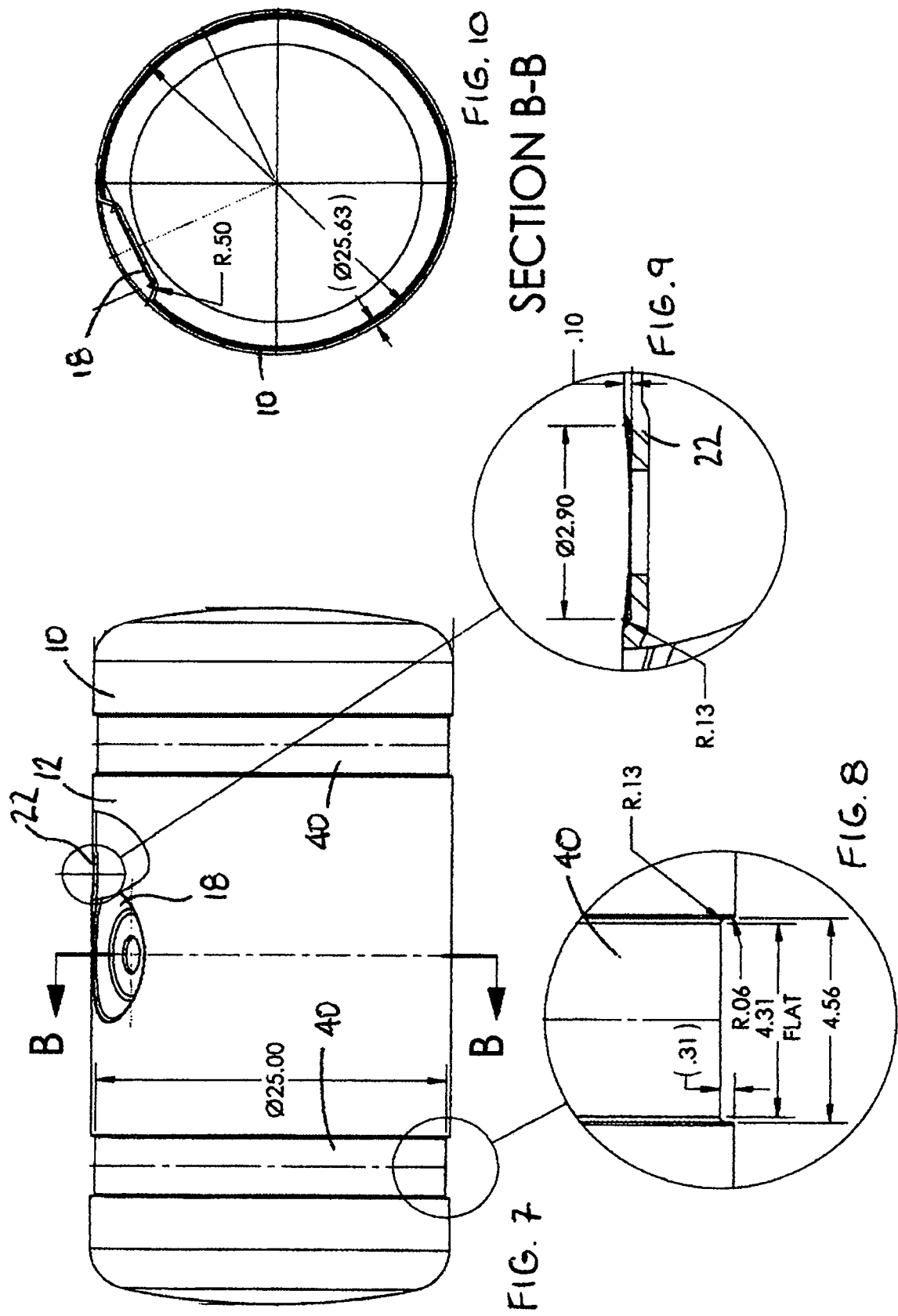

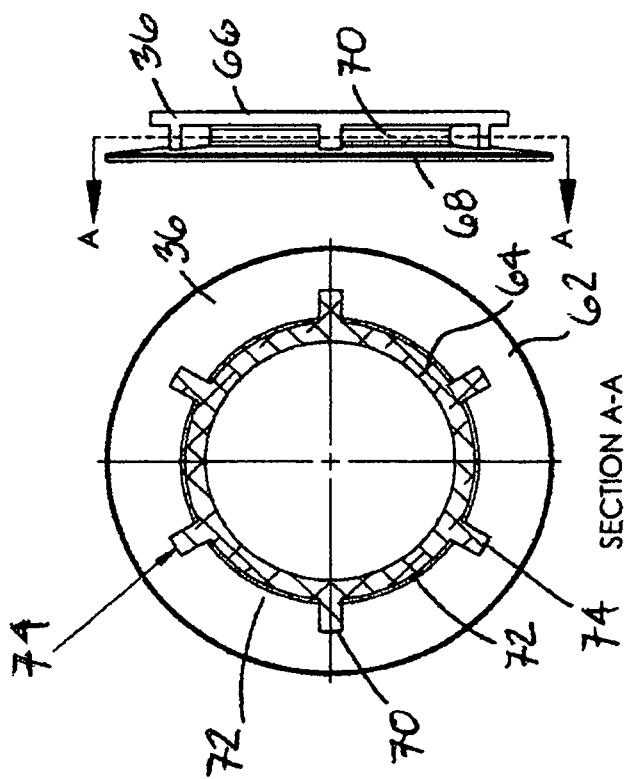
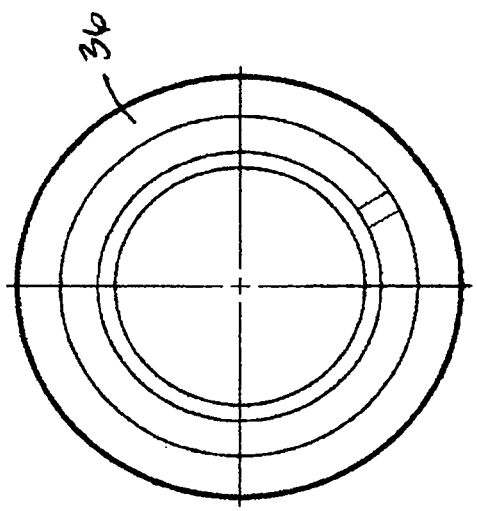
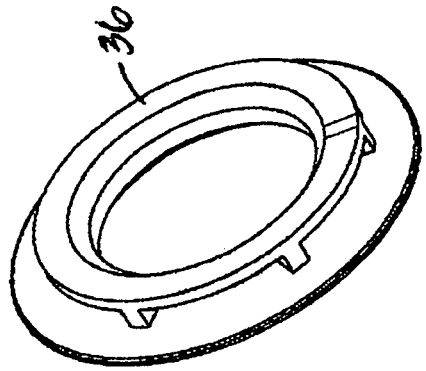

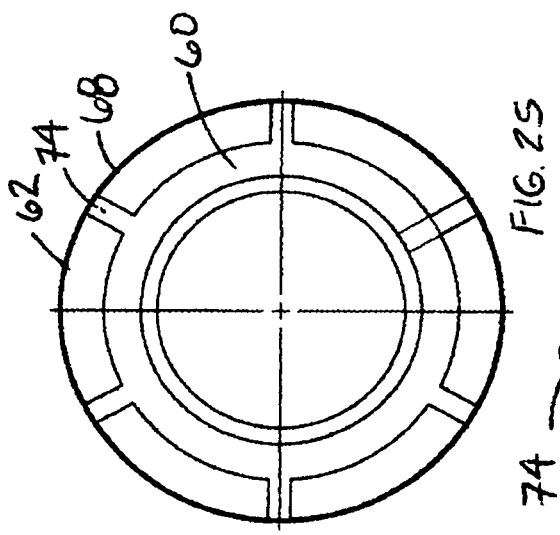
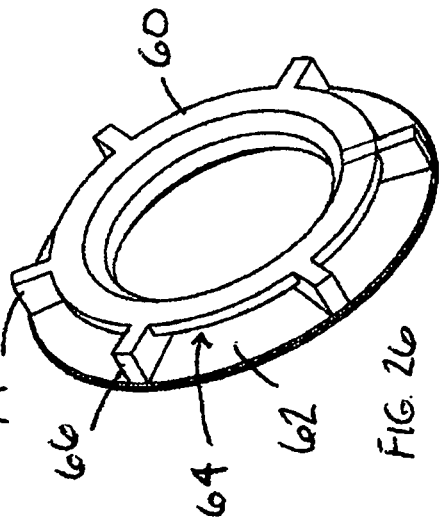
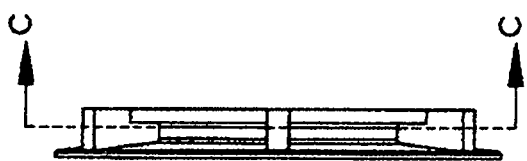
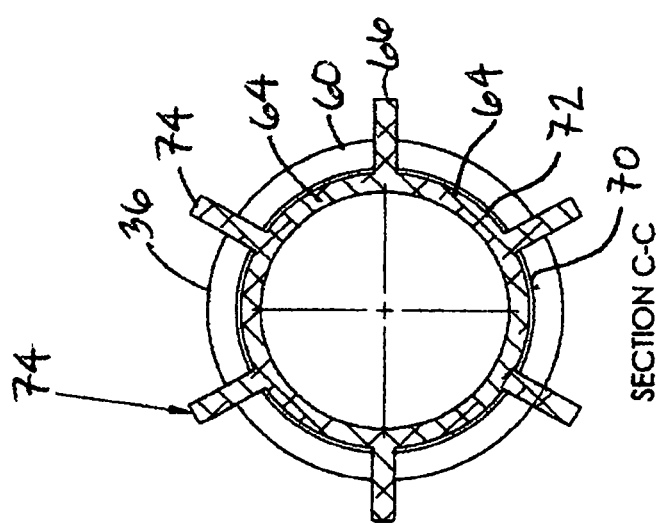

SECTION D-D

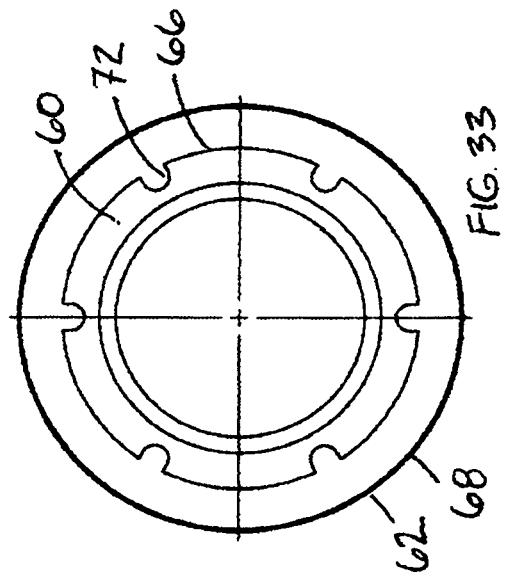
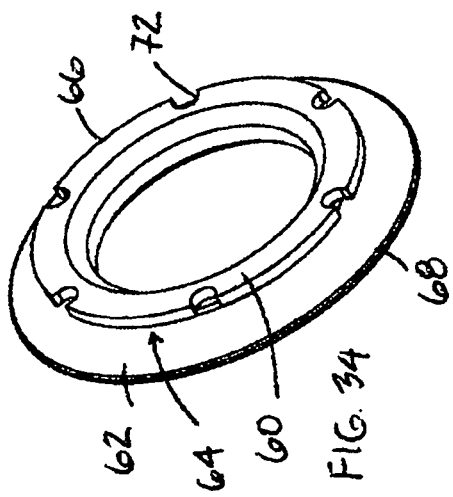
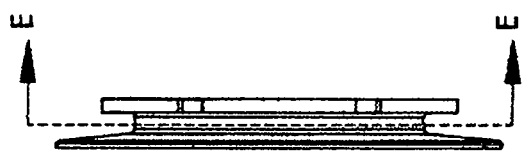
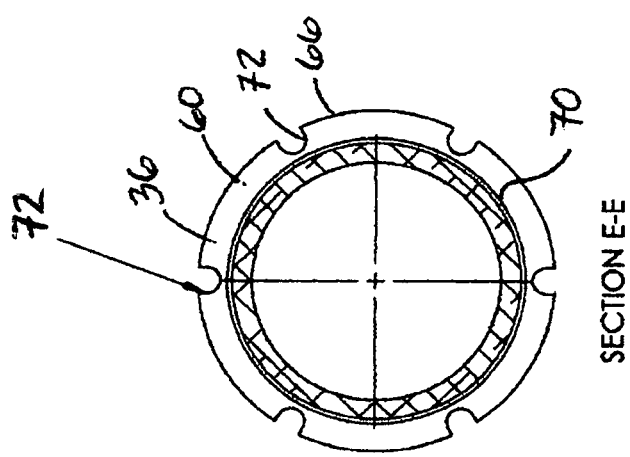

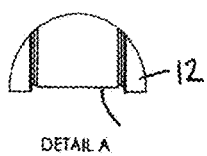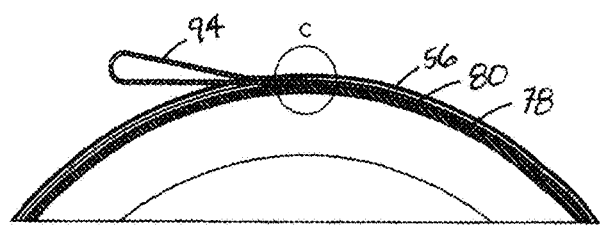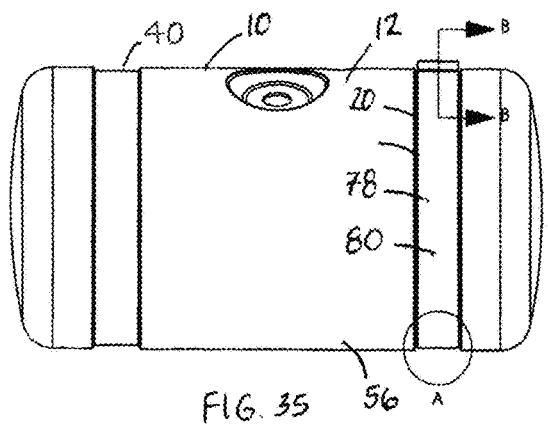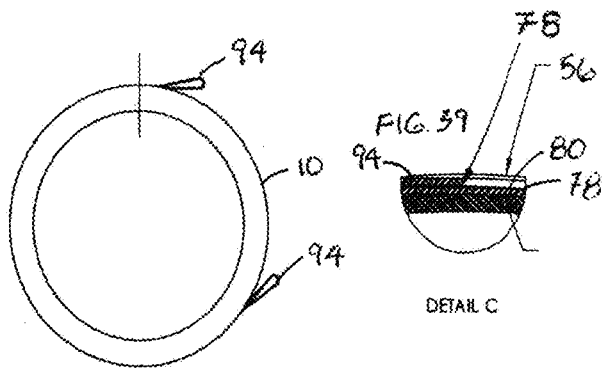

SECTION B-B
SCALE 1 : 2

MOLDED FUEL TANK AND METHOD OF MANUFACTURING THE SAME

This application is a continuation-in-part of and claims the benefit of U.S. patent application Ser. No. 13/753,518, filed on Jan. 30, 2013, in the name of Bruce Bosch and Neal Keefer, which claims priority on provisional U.S. patent application Ser. No. 61/632,759, filed on Jan. 30, 2012, in the name of Bruce Bosch and Neal Keefer.

BACKGROUND OF THE INVENTION

Truck fuel tanks typically are fabricated from multiple pieces of metal, such as steel or aluminum. The sheet of metal typically first is sheared to a rectangular shape, and then is punched or laser cut to form holes in the sheet. The sheet then is rolled into a cylinder, a "D" shape or a rectangular shape, and then welded along the longitudinal seam. The tank ends typically are formed from aluminum sheets which are welded to the built-up. i.e., rolled shell. In a final step, fittings for fuel fill, fuel drain, fuel vent, fuel suction and fuel return tubes are welded into place on the shell or on the tank ends.

This process has a number of challenges. One challenge occurs at the "T" weld joint, i.e., the location where the longitudinal seam and the circumferential seam head welds overlap. This location at the seam overlap region experiences a large number of leaks. Moreover, the overall process of welded metal fuel tank construction is very labor intensive Efforts to automate the welding process by using robotic welders has been somewhat successful in reducing the number of leaks in these tank. However, in general, tank manufacturers have a difficult time being commercially viable due to the capital intensity of the welding operation and due to the low price that the final product purchasers are willing to pay for the finished product.

There is a need, therefore, for a fuel tank with reduced probability of leaks and for a method of manufacturing a tank that is more cost effective.

SUMMARY OF THE INVENTION

One embodiment of a molded fuel tank includes a fuel tank molded from synthetic material, such as a composite polymer. One embodiment may include molding a fuel tank from synthetic materials, with metal components positioned within the fuel tank as it is molded. One embodiment may include molding a fuel tank and integral components simultaneously from synthetic materials. One embodiment of a molded fuel tank may include a fuel tank formed by a rotational molding process.

BRIEF DESCRIPTION OF THE DRAWINGS

FIG. 1 is a side view of one embodiment of a molded composite fuel tank with several cutaway portions.

FIG. 2 is a cross-sectional side view taken along line A-A of the fuel tank of FIG. 1 showing components secured within the molded fuel tank.

FIG. 3 is a partial cross-sectional side view of one embodiment of a fill neck assembly.

FIG. 4 is an isometric view of one embodiment of a sending unit flange.

FIG. 5 is an isometric view of one embodiment of a flow tube assembly.

FIG. 6 is an isometric view of one embodiment of a drain and vent fitting.

FIG. 7 is a side view of one embodiment of a molded composite fuel tank with a cutaway portion and with no components secured therein.

FIG. 8 is a detailed side view of one embodiment of a recessed tank support groove of the fuel tank of FIG. 7.

FIG. 9 is a detailed side view of one embodiment of a recessed component port of the fuel tank of FIG. 7.

FIG. 10 is a cross-sectional side view taken along line B-B of the fuel tank of FIG. 7.

FIGS. 15-18 are views of another example embodiment of a flange.

FIGS. 23-26 are views of another example embodiment of a flange.

FIGS. 31-34 are views of another example embodiment of a flange.

FIGS. 35-39 are views of an embodiment of a fuel tank with tank straps secured thereon.

DETAILED DESCRIPTION OF THE PREFERRED EMBODIMENTS

Figure 12:
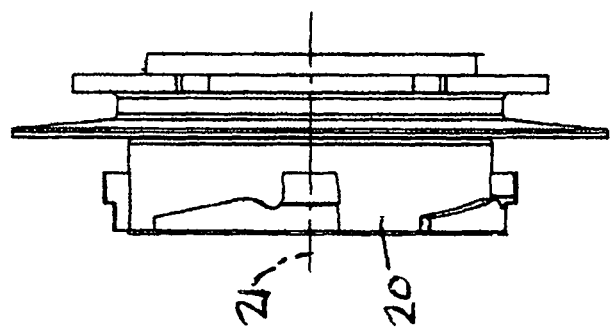
FIG. 12 is a side view of one embodiment of a cam neck assembly.

One embodiment of the present invention includes a process of rotationally molding a one-piece, one layer, fuel tank that contains all the component fastening structures on the tank, i.e., molding the tank with previously formed metal component fastening structures already in place. The advantages of this method include fewer manufacturing process steps, fewer leak paths, reduced cost and, possibly, reduced weight of the manufactured fuel tank, larger fuel tank capacity for the space occupied by the tank, when compared with prior art metal welded fuel tanks. In another embodiment the method may include molding a fuel tank with the components molded integral with the fuel tank during formation of the fuel tank. The use of a rotational molding process may allow fabrication of a fuel tank with molded metal fitting ports manufactured integral with the tank and within the polymer, eliminating subsequent welding operations. A rotational molding process may also allow fabrication of the fuel tank with synthetic material components manufactured integral with the fuel tank. Use of a molding process may allow the elimination of many of the currently used metal components by integrating threaded ports directly into the composite tank material. Another advantage of the use of a molding process may include fabrication of mounting bracketry integral with the tank during the molding process.

Fuel tank component attachment flanges: the attachment flanges described below may employ a flange/recess/flange design that promotes retention in the synthetic tank shell. This works as follows: the flange that lies on the outer plane of the tank may incorporate flat sides or slots to mechanically lock into the polymer shell and resist rotational forces.

Next, an undercut region forms a cylindrical recess into which the molten polymer flows during the molding process. Once the molded material cures, the undercut region helps to retain the part within the side wall of the molded tank. Finally, an integral flange below the undercut is further encapsulated by the polymer. The flange/undercut/flange design provides significant resistance to radial forces. Additionally or alternatively, (as in the case of the fuel fill flange) the inner flange may incorporate recesses, projections and/or flats designed to resist rotational forces.

The use of thermally conductive metal such as aluminum or brass ensures that the flanges will conduct heat from the mold surface throughout the flange profile. In the molding process, powdered polymer sticks to any mold surface that is heated, and thus sticks to all regions of the flanges as well as to the inside of the tank mold. The result is complete encapsulation of the flanges. Sealing and joint structural integrity is further ensured by the differential shrinkage between the cooling polymer and the aluminum attachment flanges, i.e., the synthetic material of the tank shrinks and/or tightens against the flange during cooling.

FIG. 1 is a side view of one embodiment of a molded composite fuel tank 10 with several cutaway portions, wherein the fuel tank 10 includes a side wall 12 and first and second end walls 14 and 16, collectively a wall of the tank. The tank 10 may include a recessed region 18 that may secure a component fastening structure 20, such as a cam neck assembly 20 thereon. The tank 10 may also include other component fastening structures or ports such as a fuel level sender port 22 and a vent port 24, for example. Components 30, such as a fuel cap 30, may be secured on the component fastening structures 20, 22 and 24. Components 30 may be any number of components, such as a fuel cap, a fuel level sender device, a drain device, a vent device, a pressure relief device, a fuel draw tube, a fuel return tube, an anti-siphon device, a tank holding strap, a tank holding bracket, a temperature measurement device, a fuel fill neck, a fuel heater, a fuel cooler, and external hose, a tube support, an electrical wire support, steps for accessing a truck cab, sleeper or behind-the-cab area of a truck, a mounting point for an aerodynamic or cosmetic fairing, a mounting point for a diesel exhaust fluid tank or associated component, a mounting point for a fuel valve or a water valve onto an exterior of the tank, and/or a mounting support or guide for valve operating handles or mechanisms, such as push/pull rods or cable, or any other component that may be desirable to mount on a fuel tank. Component fastening structure 20 may be manufactured integral with tank wall 12 and recessed from exterior surface 56 such that an outermost surface 76 of a component 30 secured to a component fastening structure 20 is positioned interiorally of the exterior surface 56 of tank wall 12. Component fastening structure 20 may include multiple component fastening points thereon such that multiple components 30 may simultaneously be secured on a single component fastening structure 20. Such an embodiment may improve the structural integrity of component fastening structure 20 by allowing the structure 20 to be manufactured in a larger perimeter or thickness than a single component securing structure, and may improve the structural integrity of tank 10 by limiting the number of component fastening structures 20 secured within tank wall 12.

The tank 10 may also include a drain port 26 on an underside thereof. The cam neck assembly, the fuel sender port, the vent port, the drain port, and any components that may be secured thereon, may be manufactured of metal and secured to the composite material molded tank during or after formation of the tank. In another embodiment the component fastening structures secured thereon may be manufactured of synthetic material and may be molded integral with the tank during formation of the tank and the component fastening structures in a single process.

The tank and its attached component fastening structures may be manufactured of any material, such as a synthetic material for example, during a molding process such as rotational molding. In this process a heated hollow mold is filled with a charge or shot weight of material. The tank is then slowly rotated (usually around two perpendicular axes) causing the softened material to disperse and stick to the walls of the mold. In order to maintain even thickness throughout the part, the mold continues to rotate at all times during the heating phase and to avoid sagging or deformation during the cooling phase. The rotational molding process may be s a high-temperature, low-pressure plastic-forming process that uses heat and biaxial rotation (i.e., angular rotation on two axes) to produce hollow, one-piece parts. The process does have distinct advantages. Manufacturing such large hollow fuel tank is much easier by rotational molding than previously known methods. Rotational molds are significantly cheaper than other types of molds. Very little material is wasted using this process, and excess material can often be re-used, making it a very economically and environmentally viable manufacturing process.

The rotational molding process may consist of four distinct phases:
1. Loading a measured quantity of synthetic material, such as a polymer in powder form, into the mold.
2. Heating the mold in an oven while it rotates, until all the polymer has melted and adhered to the mold wall. The hollow part should be rotated through two or more axes, rotating at different speeds, in order to avoid the accumulation of polymer powder. The length of time the mold spends in the oven is critical: too long and the polymer will degrade, reducing impact strength. If the mold spends too little time in the oven, the polymer melt may be incomplete. The polymer grains will not have time to fully melt and coalesce on the mold wall, resulting in large bubbles in the polymer. This has an adverse effect on the mechanical properties of the finished product.
3. Cooling the mold, usually by fan. This stage of the cycle can be quite lengthy. The polymer must be cooled so that it solidifies and can be handled safely by the operator. This typically takes tens of minutes. The part will shrink on cooling, coming away from the mold, and facilitating easy removal of the part. The cooling rate must be kept within a certain range. Very rapid cooling (for example, water spray) would result in cooling and shrinking at an uncontrolled rate, producing a warped part.
4. Removal of the part.

During the process the air temperature and the internal pressure in the mold may be monitored, allowing the part to be removed from the mold at a time to achieve desirable properties of the molded synthetic material.

The material used to manufacture the fuel tank may include materials from the polyethylene family: cross-linked polyethylene (PEX), low-density polyethylene (LDPE), linear low-density polyethylene (LLDPE), high-density polyethylene (HDPE), and regrind. Other compounds are PVC plastisols, nylons, and polypropylene. In particular, the fuel tank and components may be manufactured from Polyethylene, Polypropylene, Polyvinyl chloride, Nylon, Polycarbonate, Aluminum, Acrylonitrile butadiene styrene (ABS), Acetal, Acrylic, Epoxy, Fluorocarbons, Ionomer, Polybutylene, Polyester, Polystyrene, Polyurethane, and Silicone. In one embodiment the invention comprises a fuel tank having a tank wall manufactured of a single layer of cross-linked polyethylene material with components secured within the single layer of material.

Recessed fuel cap: In the embodiment shown, a fuel fill neck 28 is inset into the tank shell 12 a distance sufficient to locate the fill cap 30 flush (or slightly below) the surface 56 of the tank shell. This positioning is meant to reduce stresses on the interface between fill neck 28 and tank shell 12 during federal compliance testing fill pipe drop tests. The upper portion, or outer surface 32 (FIG. 3), of the fill neck flange, is circular. The lower portion, or inner surface 34, of the fill neck flange incorporates slots that resist the rotational forces of fuel cap removal or installation.

Integrated fuel level sender port: The fuel level sending unit mounting flange 36 (FIG. 4) is inset slightly into the tank shell 12 by recessed port 22 to provide a means of attaching a fuel sender unit. It is inset just enough to provide a flat surface 100 (FIG. 42) for attaching a standard fuel level sender without extending beyond the diameter or exterior surface 56 of the tank shell 12. Flat surface 100 of tank 10 (FIG. 42) is positioned perpendicular to an elongate axis 21 of component fastening structure 20, and may be positioned in the same plane 104 (shown in side view) as the exterior surface 102 of the first region 60, or first flange 60, of the fastening structure 20, at a position on the fuel tank exterior surface 56 where the component fastening structure 20 is secured.

Drain port and vent port: A port mounting boss 38 (FIG. 6) is utilized to provide a means of attaching a standard fuel tank vent or in the case of the drain port, a standard pipe plug. The design is similar to that of the fuel sending unit flange.

Recessed tank support band grooves: Rotational molding facilitates the integration of inset areas 40 for tank support bands. This inset (or insets 40) adds structural rigidity to the tank shell 12 and helps the truck builder locate the tank on a truck chassis. Insets 40 may be referred to as a component fastening structure 40 that receives therein a component, such as tank straps or band 78, to secure the fuel tank 10 to a truck. In the example embodiment shown, insets 40 extend completely around the exterior surface 56 of tank wall 12 so that an outermost surface 80 of a tank strap 78 is positioned interiorly of exterior surface 56 of tank wall 12.

FIG. 2 is a cross-sectional side view taken along line A-A of the fuel tank 10 of FIG. 1 showing component fastening structures secured within the molded fuel tank. The component fastening structures, such as the cam neck assembly 20, that defines an elongate axis 21, the fuel level sender port 22, the vent port 24, the drain port 26, the fuel fill neck 28, and other component fastening structures, may all be manufactured prior to manufacture of the tank and secured within the tank 10 during manufacture of the tank 10. In such a process, the component fastening structures may be secured within a mold and the tank molded around the component fastening structures. In another embodiment, the component fastening structures may be manufactured integral with a tank such that the tank mold includes regions for formation of the component fastening structures simultaneously with the fuel tank itself. The component fastening structures may be manufactured of any materials as may be suited for a particular process or application. In the embodiment wherein the component fastening structures are manufactured integral with the fuel tank 10, the component fastening structures will generally be formed of the same material as the fuel tank or of a durable material, such as metal.

Supply and return tubes: The design of the present invention is specifically adapted to take advantage of the rotational molding process. The process facilitates the use of thin-walled extruded tubing for a significant material cost saving. The supply and return tubes 42 and 44 (FIG. 5), respectively, may be welded, soldered or bonded into individual adapter flanges of similar design to that described above. The roto-mold process facilitates the use of a supporting standoff 46 near the lower end 48 of the tubes (this support reduces bending stresses and thus allows the use of thinner tubing). There is an additional bend 50 in the tubes that creates a clamping surface 52 (FIG. 5) perpendicular to the standoff. The tubes are slidably connected to the standoff by means of a metal or extruded polymer clip 54. This arrangement reduces bending in the tubes by adding a simple support that resists lateral forces, while allowing some relative axial movement, i.e., sliding movement along the axis of the tubes, between the tubes and the standoff in order to accommodate differential shrinkage between the polymer tank shell and the aluminum tubes during the mold cooling process.

FIG. 3 is a partial cross-sectional side view of one embodiment of a fill neck assembly 28.

Referring now to FIGS. 1 and 4, FIG. 4 is an isometric view of one embodiment of a sending unit flange 36. In this embodiment, flange 36, also referred to as a component fastening structure, may be secured within and extending through tank wall 12 and between an exterior 56 of the fuel tank 10 and an interior 58 of the fuel tank 10, the component fastening structure 36 including a first region 60 positioned in a plane of exterior surface 56, a second region 62 positioned in a plane of interior surface 58, and a central region 64 positioned there between, the first, second and central regions 60, 62 and 64 each defining a perimeter 66, 68 and 70, respectively, measured in a plane parallel to a plane of exterior surface 56 at a position 72 (shown in FIG. 1 as a position where fuel level sender port 22 is secured) on exterior surface 56 where a component fastening structure is secured, the central region perimeter 70 being smaller than the perimeter of the first 66 and the second 68 regions. Each of first region 60, second region 62 and central region 64 are positioned along elongate axis 21 of fastening structure 20 in a non-overlapping sequence such that the regions do not overlap with one another.

One or more of perimeter regions 66, 68 and 70 may include a non-circumferential shape around the perimeter of the first, second and/or central regions so as to inhibit rotation of the component fastening device 36 within a wall 12 of tank 10. In the embodiment shown in FIG. 4, first and second regions 66 and 68 each define a hexagon perimeter shape whereas central region 70 defines a circular perimeter shape.

FIG. 5 is an isometric view of one embodiment of a flow tube assembly showing supply and return tubes 42 and 44 supported by standoff 46. Standoff 46 may be referred to as a component fastening structure 46 that is secured within tank wall 12 and extends inwardly from interior surface 58 of tank 10 into the interior of the fuel tank 10. Tube 42 or 44 positioned within the fuel tank interior may include a first end 82 extending through tank wall 12 to the exterior of the fuel tank 10 and a second end 84 secured within the interior of the fuel tank 10 by component fastening structure 46. Due to the securement of second end 84 at standoff 46, thin walled extruded tubing may be utilized for tubes 42 and 44, because the tubes 42 and 44 are each secured at their first 82 and their second 84 ends, thereby reducing the need for thick walled tubes.

Referring now to FIGS. 2 and 5, tubes 42 and 44 may include a bend 50 therein such that second end 84 of tubes 42 and 44 are each positioned parallel to a plane 86 of interior surface 58 of fuel tank 10 at a position where component fastening structure 46 extends inwardly from interior surface 58. In this manner, second end 84 of tubes 42 and 44 will be positioned parallel to a clamping portion 88 of component fastening structure 46 such that the structure 46 movably secures tubes 42 and 44 therein so as to allow axial movement of second ends 84 of tube 42 and 44 therein along an elongate axis 90 of second ends 84 of tubes 42 and 44.

FIG. 6 is an isometric view of one embodiment of a drain and vent fitting 38.

FIG. 7 is a side view of one embodiment of a molded composite fuel tank 10 with a cutaway portion and with no components secured therein.

FIG. 8 is a detailed side view of one embodiment of a recessed tank support groove 40 of the fuel tank of FIG. 7.

FIG. 9 is a detailed side view of one embodiment of a recessed component port 22 of the fuel tank 10 of FIG. 7.

FIG. 10 is a cross-sectional side view taken along line B-B of the fuel tank 10 of FIG. 7.

Figure 11:
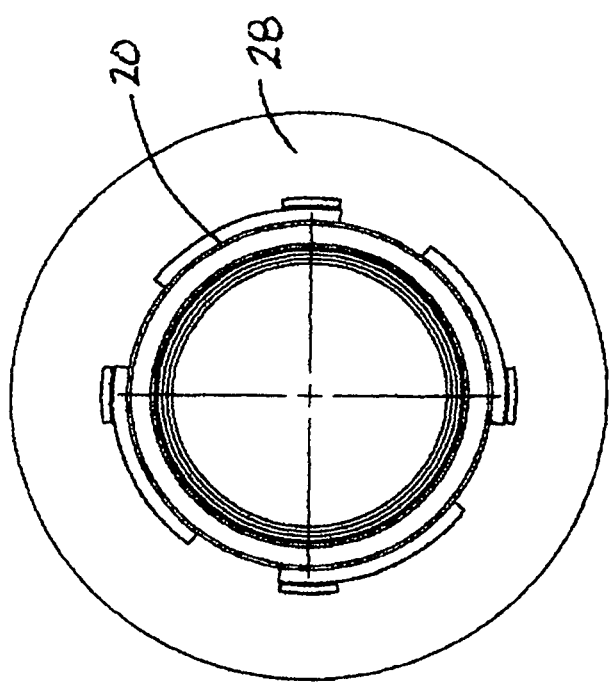
FIG. 11 is a top view of one embodiment of a cam neck assembly.

FIG. 11 is a top view of one embodiment of a cam neck assembly 20.

FIG. 12 is a side view of one embodiment of a cam neck assembly 20.

Figure 13:
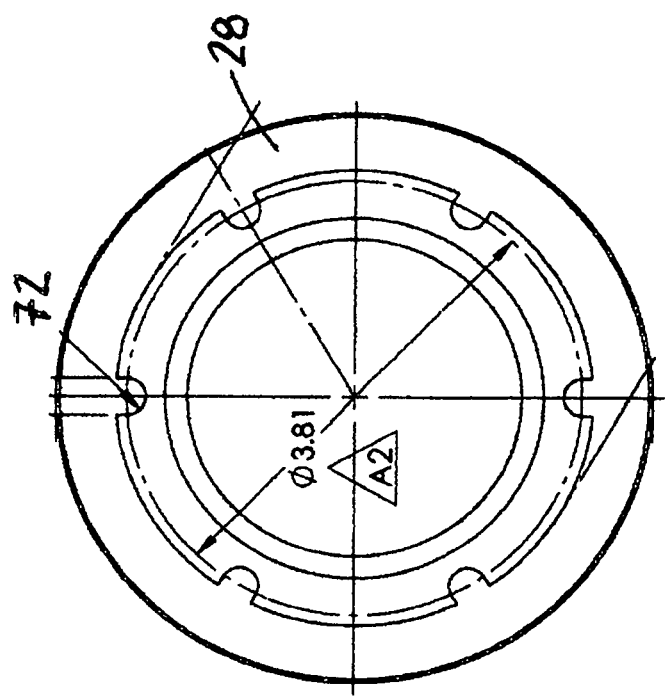
FIG. 13 is a top view of one embodiment of an adapter fill neck assembly.
Figure 21:
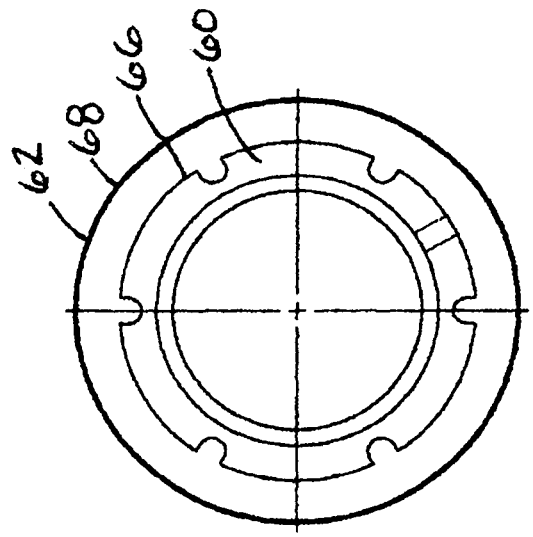
FIGS. 19-22 are views of another example embodiment of a flange.
Figure 22:
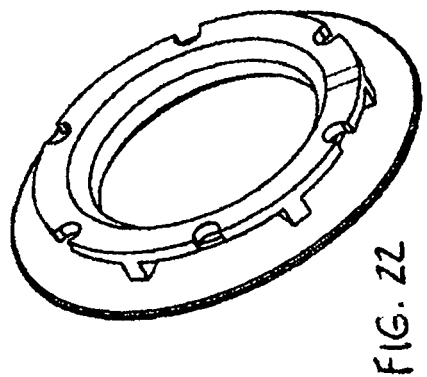
Figure 20:
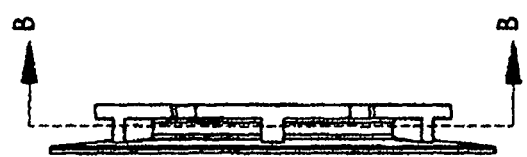
Figure 19:
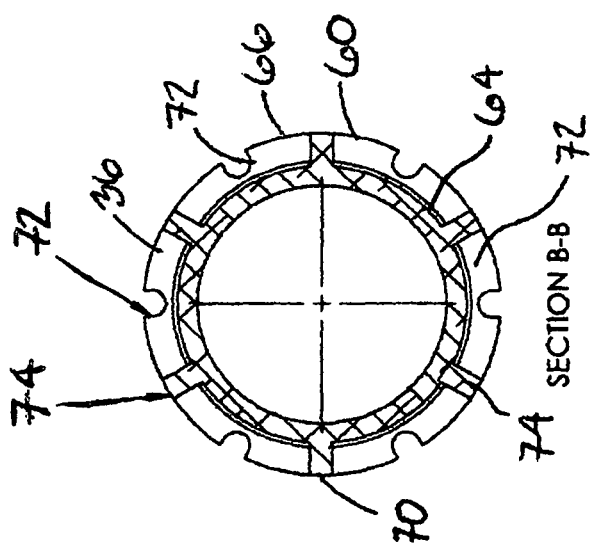
Figure 29:
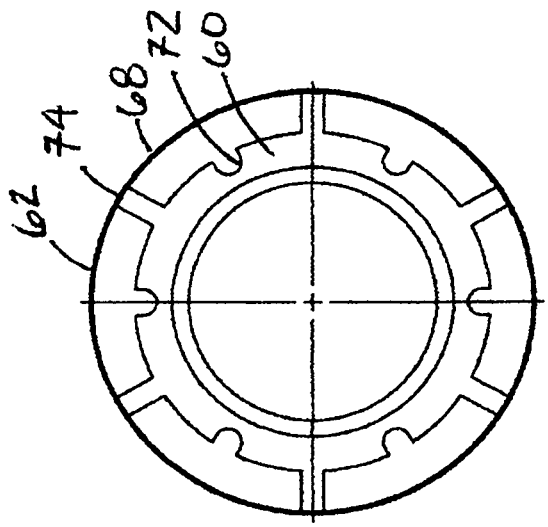
FIGS. 27-30 are views of another example embodiment of a flange.
Figure 30:
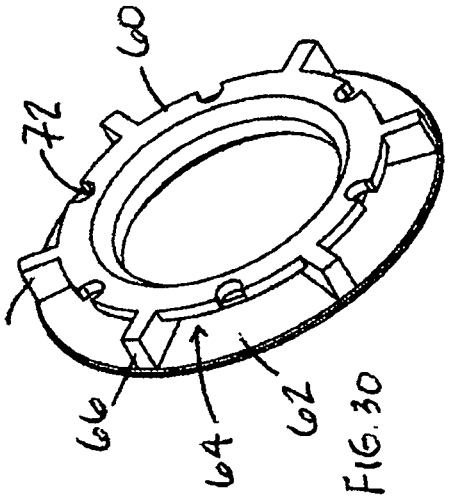
Figure 28:
Figure 27:
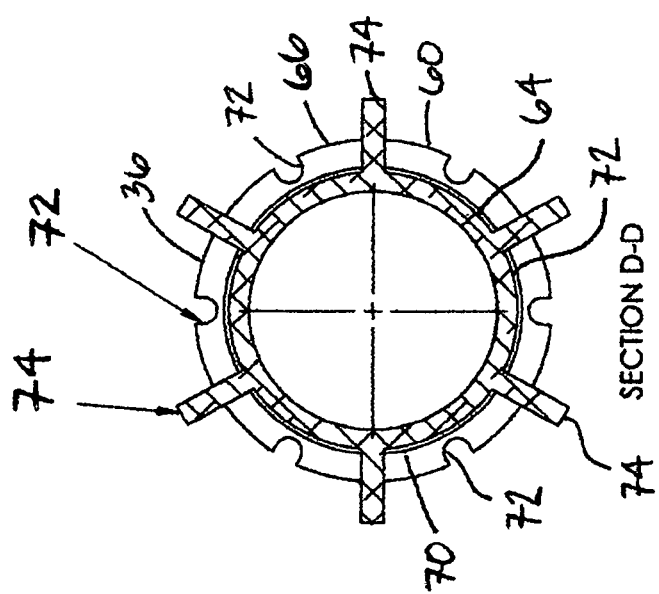
Figure 41:
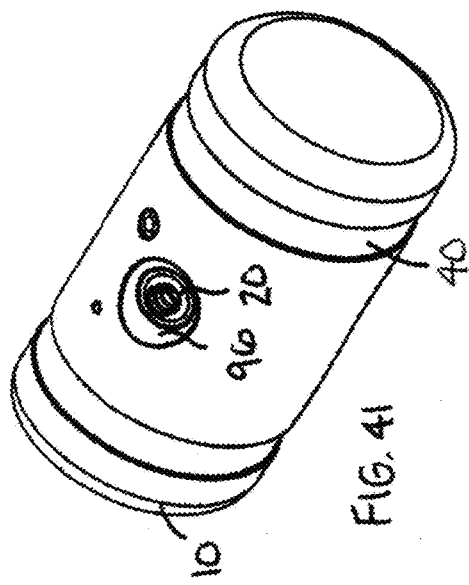
FIGS. 40-43 are views of an embodiment of a fuel tank with a fuel receiving well positioned around a recessed fuel filler neck.
Figure 43:
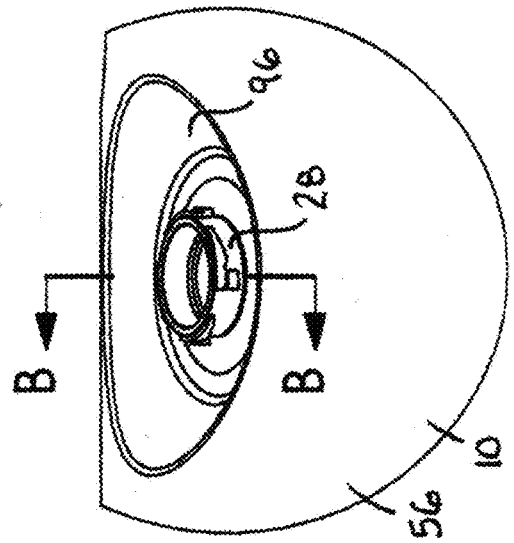
Figure 40:
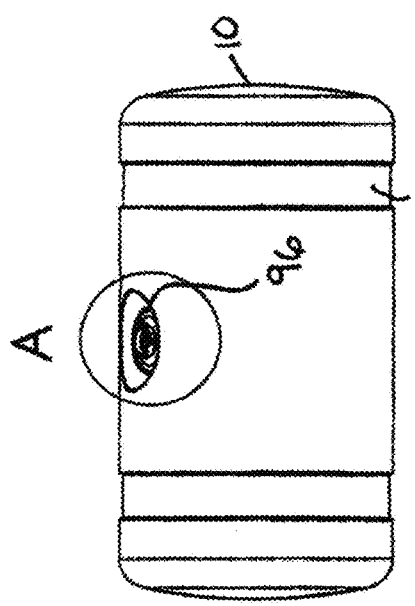

FIG. 13 is a top view of one embodiment of an adapter fill neck assembly 28.

Figure 14:
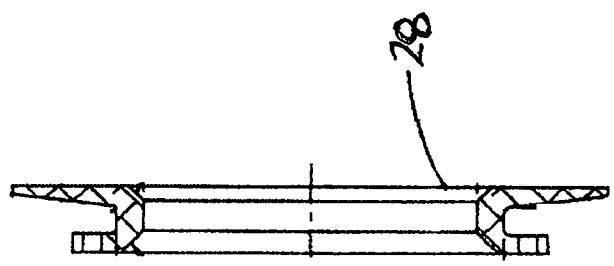
FIG. 14 is a cross-sectional side view of one embodiment of an adapter fill neck assembly.

FIG. 14 is a cross-sectional side view of one embodiment of an adapter fill neck assembly 28. As shown in this figure, the component fastening structure 20 may be manufactured as a single, integral structure from a single piece of material.

FIGS. 15-18 are views of another example embodiment of a component fastening structure, such as a flange 36, that may be utilized to mount a component 30 thereon, such as a fuel cap, a fuel level sender device, a drain device, a vent device, a pressure relief device, a fuel draw tube, a fuel return tube, an anti-siphon device, a tank holding strap, a tank holding bracket, a temperature measurement device, a fuel fill neck, a fuel heater, a fuel cooler, an external hose, a tube support, an electrical wire support, steps for accessing a truck cab interior, a mounting point for an aerodynamic fairing, a mounting point for a cosmetic fairing, a mounting point for a diesel exhaust fluid tank, a mounting point for an exhaust associated component, a mounting point for a fuel valve, a mounting point for a water valve, a mounting support for a valve operating mechanism including push and pull rods and cables, and a mounting guide. Component fastening structure 36 includes the flange-recess-flange structure of flange 36 shown in FIG. 4. In this embodiment, the central region 64 of flange 36 of FIG. 15 includes a non-circumferential perimeter shape 70 including a recess 72 extending radially inwardly from said perimeter 70, said recess 72 having synthetic material of said tank wall positioned therein. Recesses 72 may be described as defining outwardly extending projections 74 that "lock into" the synthetic material of side wall 12 of tank 10 during manufacturing thereof. In this manner, flange 36 is prohibited or inhibited from rotating within side wall 12 (or walls 14 or 16) after formation of tank 10. Accordingly, recesses 72 and projections 74 (which may also be positioned on first and/or second regions 60 and 62 of flange 36) may be thought of as anti-rotation structure structured to inhibit rotation of the fastening structure 36 within tank wall 12.

FIGS. 19-22 are views of another example embodiment of a flange 36 wherein first region 60 includes anti-rotation notches or recesses 72 positioned around perimeter 66. Central region 64 includes recessed regions 72 that define projections 74 positioned around perimeter 70. Second region 62 is shown having a circular shaped perimeter 68.

FIGS. 23-26 are views of another example embodiment of a flange 36 wherein first region 60 includes projections 74 positioned around perimeter 66. Central region 64 includes recessed regions 72 that define projections 74 positioned around perimeter 70, wherein the projections 74 of central region 64 are congruent with the projections 74 of first region 60. Second region 62 is shown having a circular shaped perimeter 68.

FIGS. 27-30 are views of another example embodiment of a flange 36 wherein first region 60 includes projections 74 positioned around perimeter 66. Central region 64 includes recessed regions 72 that define projections 74 positioned around perimeter 70, wherein the projections 74 of central region 64 are congruent with the projections 74 of first region 60. First region 60 further includes recesses 72 positioned around perimeter 66. Second region 62 is shown having a circular shaped perimeter 68.

FIGS. 31-34 are views of another example embodiment of a flange 36 wherein first region 60 includes recesses 72 positioned around perimeter 66. Central region 64 and second region 62 both define a circular shaped perimeter 70 and 68, respectively.

FIGS. 35-39 are views of an embodiment of a fuel tank 10 with tank straps 78 secured within component fastening structure 20, referred to in this embodiment as tank strap recesses 92. Recesses 92 may extend completely around tank 10 so that the recessed region of recesses 92, recessed with respect to a remainder of side wall 12, will add rigidity and structural strength to side wall 12 of tank 10. Additionally, recesses 92 allow tank straps 78, or other components 78, such as mounting brackets, truck cab step securement devices, or the like, to be secured on a tank 10 with an outermost surface 80 of the component 78 positioned inwardly of exterior surface 56 of tank 10. This may reduce the space occupied by tank 10 and components 78 so that a larger tank fill capacity may be achieved with a tank of the present invention, when compared with prior art fuel tanks. In this embodiment, tank straps 78 may each include one or more mounting straps 94 secured thereto, wherein the mounting straps 94 may allow mounting of tank 10 to a fuel truck.

FIGS. 40-43 are views of an embodiment of a fuel tank 10 with a fuel receiving well 96 positioned around a recessed fuel filler neck 28. Fuel filler neck 28 may be referred to as a component fastening structure 20 wherein a component, such as a fuel cap 30, may be secured thereon. A lowermost surface of well 96 may be positioned inwardly of a topmost surface 98 of component fastening structure 20 and inwardly of exterior surface 56 of tank 10 such that fuel spilled from fuel filler neck 28 during filling of tank 10 will be held within well 96, rather than spilling down exterior surface 56 of tank 10 onto the ground, where such fuel spillage may be considered a hazardous material spill. Moreover, well 96 may provide room for an operator's hand to comfortably grip a cap 30 secured on fuel filler neck 28 so as to comfortably loosen or tighten the cap on fuel filler neck 28. Well 96 is positioned interiorly of exterior surface 56 of tank 10 such that when a cap 30 is secured on fuel fill neck assembly 28, an uppermost surface of cap 30 is positioned interiorally or below exterior surface 56 of tank 10. Accordingly, during a drop test of the tank the cap 30 may not be impacted or affected during the fall, thereby increasing the likelihood that the structural integrity and durability of the tank during impact will remain intact.

Figure 42:
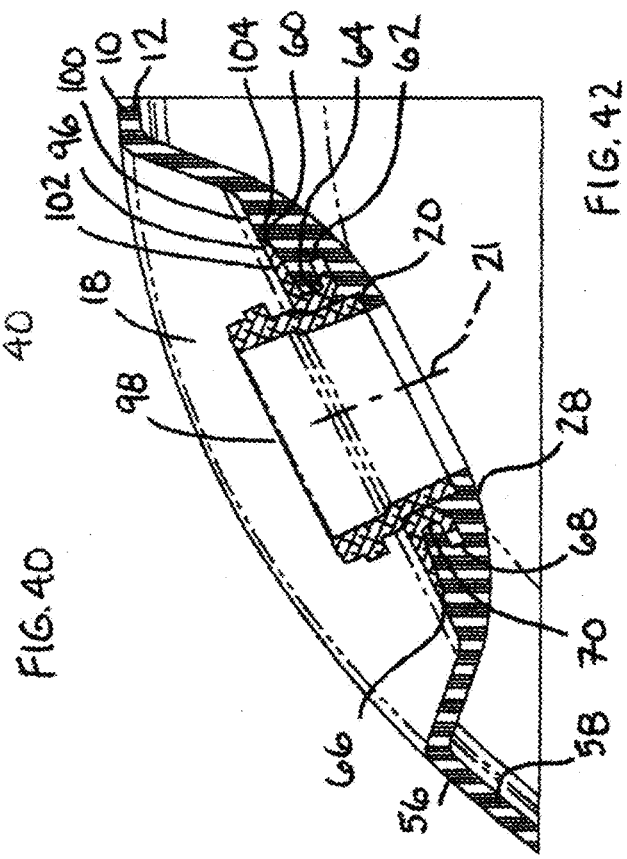

FIG. 42 shows the component 20 of FIG. 3 installed in a tank wall 12. In this view tank wall 12 is shown comprising a single layer of rotationally molded cross-linked polyethylene material. The single layer of tank wall 12 is formed during a single rotational molding process, i.e., a single melt process, so that the material of tank wall 12 is uniform and consistent completely throughout tank wall 12 from exterior surface 56 of tank wall 12 through to interior surface 58 of tank wall 12. In other words, tank wall 12 is not manufactured in multiple stages where different, individual layers are formed on top of one another to provide a layered tank wall. In contrast, tank wall 12 of the present invention is the thickness of a single layer of material, formed at one time during a single rotational molding process, to provide a single layer tank wall of uniform material throughout the entire tank wall 12 of fuel tank 10.

Manufacturing tank 10 with a single layer tank wall, i.e., a tank wall manufactured of a single material, or a mix of materials, in a single rotational molding process, eliminates the disadvantages of separation of individual tank wall layers from one another, which may lead to failure of such multi layer tank walls. Moreover, utilizing a single layer tank wall allows a component 20 to be captured by the single layer of tank wall material, such as cross-linked polyethylene, to provide a robust securement of the component within the tank wall. In contrast, a multiple layer system might provide a less robust attachment of a component therein because the multiple layers may separate from one another right at the contact point of the layers with a component secured through such a tank wall.

The single layer tank wall system of the present invention provides for a robust fuel tank that increases securement of a component with the single layer of the tank wall by eliminating multiple layers of material abutting a component, reduces manufacturing time because only a single rotational molding melt and curing process is utilized, and eliminates the issue of separation of tank wall layers from one another.

In the above description numerous details have been set forth in order to provide a more through understanding of the present invention. It will be obvious, however, to one skilled in the art that the present invention may be practiced using other equivalent designs.

We claim:

1. A synthetic fuel tank, comprising:
   a tank wall manufactured of one piece of rotationally molded cross-linked polyethylene material and including an exterior surface and an interior surface, said exterior surface in direct communication with and defining an exterior of said fuel tank and said interior surface in direct communication with and defining an interior of said fuel tank; and
   a component fastening structure secured completely within and extending through said tank wall and between said exterior surface of said fuel tank and said interior surface of said fuel tank, said component fastening structure including a first region positioned in a plane of said exterior surface, a second region, and a central region positioned there between, said first, second and central regions each defining an outermost perimeter measured in a plane parallel to a plane of said exterior surface at a position on said exterior surface where said component fastening structure is secured, said central region outermost perimeter being smaller than said outermost perimeter of said first and said second regions,
   wherein said cross linked polyethylene material is positioned abutting a surface of said outermost perimeter of each of said first region, said second region and said central region of said component fastening structure.

2. The tank of claim 1 wherein at least one of said first, second and central regions of said component fastening structure includes a non-circumferential shape around said perimeter of said at least one of said first, second and central regions.

3. The tank of claim 2 wherein said non-circumferential shape includes a recess extending radially inwardly from said perimeter, said recess having said cross-linked polyethylene material of said tank wall positioned therein.

4. The tank of claim 2 wherein said non-circumferential shape includes anti-rotation structure structured to inhibit rotation of said fastening structure within said tank wall.

5. The tank of claim 1 wherein said component fastening structure is structured to receive a component thereon, said component chosen from the group consisting of: a fuel cap, a fuel level sender device, a drain device, a vent device, a pressure relief device, a fuel draw tube, a fuel return tube, an anti-siphon device, a tank holding strap, a tank holding bracket, a temperature measurement device, a fuel fill neck, a fuel heater, a fuel cooler, an external hose, a tube support, an electrical wire support, steps for accessing a truck cab interior, a mounting point for an aerodynamic fairing, a mounting point for a cosmetic fairing, a mounting point for a diesel exhaust fluid tank, a mounting point for an exhaust associated component, a mounting point for a fuel valve, a mounting point for a water valve, a mounting support for a valve operating mechanism including push and pull rods and cables, and a mounting guide.

6. The fuel tank of claim 1 wherein said one piece tank wall comprises only a single layer of cross linked polyethylene material.

7. The fuel tank of claim 6 wherein said one piece tank wall comprises a single layer of material including cross linked polyethylene mixed with at least one other material chosen from the group consisting of low-density polyethylene (LDPE), linear low-density polyethylene (LLDPE), high-density polyethylene (HDPE), regrind, PVC plastisols, Polyethylene, Polypropylene, Polyvinyl chloride, Nylon, Polycarbonate, Aluminum, Acrylonitrile butadiene styrene (ABS), Acetal, Acrylic, Epoxy, Fluorocarbons, Ionomer, Polybutylene, Polyester, Polystyrene, Polyurethane, and Silicone.

8. The tank of claim 1 wherein said first region of said fastening structure defines an exterior surface that is positioned in said plane of said exterior surface of said tank, and wherein said second region of said fastening structure defines an interior surface that is positioned within said tank wall of said fuel tank.

9. A synthetic fuel tank, comprising:
   a tank wall manufactured of one piece of rotationally molded cross-linked polyethylene material and including an exterior surface and an interior surface, said exterior surface in direct communication with and defining an exterior of said fuel tank and said interior surface in direct communication with and defining an interior of said fuel tank; and
   a component fastening structure secured completely within and extending through said tank wall and between said exterior surface of said fuel tank and said interior surface of said fuel tank, said component fastening structure including a first region positioned in a plane of said exterior surface, a second region, and a central region positioned there between, said first, second and central regions each defining an outermost perimeter measured in a plane parallel to a plane of said exterior surface at a position on said exterior surface where said component fastening structure is secured, said central region outermost perimeter being smaller than said outermost perimeter of said first and said second regions, wherein said fastening structure defines a central aperture surface that extends through said first, second and central regions of said fastening structure, wherein each of said first, second and central regions include a depth measured parallel to said central aperture surface and a width measured perpendicular to said central aperture surface and that extends from each respective outermost perimeter to said central aperture surface, and wherein each of said first, second and central regions define a solid thickness completely along their respective depth and completely along their respective width.

10. A synthetic fuel tank, comprising:

a tank wall manufactured of one piece of rotationally molded cross-linked polyethylene material and including an exterior surface and an interior surface that together define a tank wall thickness that extends there between; and a component fastening structure secured completely within said tank wall thickness and including a first region, a second region and a central region positioned there between, said tank wall polyethylene material abutting an outermost perimeter of each of said first region, said second region and said central region of said component fastening structure, and said outermost perimeter of said central region being smaller than said outermost perimeter of said first region and said outermost perimeter of said second region.

11. The tank of claim 10 wherein said fastening structure defines a central aperture surface that extends through said first, second and central regions of said fastening structure, wherein each of said first, second and central regions include a depth measured parallel to said central aperture surface and a width measured perpendicular to said central aperture surface and that extends from each respective outermost perimeter to said central aperture surface, and wherein each of said first, second and central regions define a solid thickness completely along their respective depth and completely along their respective width.

12. The tank of claim 10 wherein each of said first, second and central regions defines a continuous thickness completely throughout each of said first, second and central regions, said thickness measured from said outermost perimeter of each of said first, second and central regions and extending to a central aperture of said fastening structure.

13. A synthetic fuel tank, comprising:

a tank wall manufactured of one piece of rotationally molded cross-linked polyethylene material and including an exterior surface and an interior surface that together define a tank wall thickness that extends there between; and a component fastening structure secured completely within said tank wall thickness and including a first region, a second region and a central region positioned there between, said tank wall polyethylene material abutting an entirety of an outermost surface of each of said first region, said second region and said central region of said component fastening structure, and said outermost surface of said central region defining a smaller radius than a radius of said outermost surface of said first region and a radius of said outermost surface of said second region.

* * * * *